(12) United States Patent
Johnson et al.

(10) Patent No.: US 10,509,118 B2
(45) Date of Patent: Dec. 17, 2019

(54) SYSTEMS AND METHODS FOR MEASURING WAVE FIELDS OF A BODY OF WATER

(71) Applicants: Ohio State Innovation Foundation, Columbus, OH (US); THE REGENTS OF THE UNIVERSITY OF MICHIGAN, Ann Arbor, MI (US)

(72) Inventors: Joel Johnson, Dublin, OH (US); Andrew O'Brien, Columbus, OH (US); David Lyzenga, Ann Arbor, MI (US); Graeme Smith, Columbus, OH (US); Shanka N. Wijesundara, Belchertown, MA (US)

(73) Assignees: Ohio State Innovation Foundation, Columbus, OH (US); The Regents of the University of Michigan, Ann Arbor, MI (US)

( * ) Notice: Subject to any disclaimer, the term of this patent is extended or adjusted under 35 U.S.C. 154(b) by 382 days.

(21) Appl. No.: 15/494,002

(22) Filed: Apr. 21, 2017

(65) Prior Publication Data

US 2017/0307748 A1 Oct. 26, 2017

Related U.S. Application Data

(60) Provisional application No. 62/325,576, filed on Apr. 21, 2016, provisional application No. 62/359,732, filed on Jul. 8, 2016.

(51) Int. Cl.
*G01S 13/02* (2006.01)
*G01S 13/58* (2006.01)

(52) U.S. Cl.
CPC .................. *G01S 13/581* (2013.01)

(58) Field of Classification Search
CPC .... G01S 13/581; G01S 13/917; G01S 13/956; G01S 7/288; Y02A 90/18
USPC ........................................... 342/21
See application file for complete search history.

(56) References Cited

U.S. PATENT DOCUMENTS

2008/0112469 A1* 5/2008 Goldberg .............. G01S 19/24 375/150

\* cited by examiner

*Primary Examiner* — Timothy A Brainard
(74) *Attorney, Agent, or Firm* — Benesch, Friedlander, Coplan & Aronoff LLP

(57) ABSTRACT

This disclosure relates to systems and methods for measuring wave fields of a body of water. A system can include a radiation source and an antenna that can cooperate with the radiation source to transmit a radio frequency (RF) signal to a wave field having one or more waves. The antenna can receive backscattered signals from the wave field. The system can include a local oscillator and a processor. The local oscillator downconverts the backscattered signals into baseband signals and the processor can process the baseband signals to determine a relative velocity of each of the waves of the wave field. The processor can further be programmed to identify an observed portion of the backscattered signals as bad data and remove the bad data from further processing.

25 Claims, 3 Drawing Sheets

SYSTEMS AND METHODS FOR MEASURING WAVE FIELDS OF A BODY OF WATER

CROSS-REFERENCED TO RELATED APPLICATION

This application claims the benefit of U.S. Provisional Application No. 62/325,576, filed on Apr. 21, 2016, entitled "RADAR SYSTEM FOR ENVIRONMENTAL AND SHIP MOTION FORECASTING" and U.S. Provisional Application No. 62/359,732, filed on Jul. 8, 2016, entitled "SYSTEMS AND METHODS FOR MEASURING WAVE FIELDS", the contents of both are incorporated herein by reference.

GOVERNMENT LICENSE RIGHTS

This invention was made with government support under Office of Naval Research grant numbers N00014-11-D0270 and N00014-11-D-0370. The government has certain rights in the invention.

TECHNICAL FIELD

This disclosure generally relates to systems and methods for measuring wave fields of a body of water. More specifically, this disclosure relates to systems and methods for measuring wave fields of a body of water using radar technology.

BACKGROUND

Interest in height and velocity information associated with water waves, (ocean waves, sea waves, etc.) has been increasing in recent years as a result of the numerous potential applications of such information (e.g. cargo transfer at sea, helicopter landing, etc.). These applications can use not only instantaneous information, but also the potential forecast of the sea waves and their impacts over short time scales into the future by combining radar measured information with methods for predicting sea surface wave evolution in time.

Object-detection systems, such as microwave radar systems, typically used on ship-based or ground-based platforms have the ability to measure water waves to distances of at least a few kilometers and the ability to provide measurements in most weather conditions. In addition, microwave radar systems configured for X band measuring are already widely utilized for marine navigation.

However, several challenges remain with achieving robust water wave measurements. An existing challenge, is that ship-based or ground-based radar measurements have a "low grazing angle" and at extensive measuring ranges complicates the physics of a surface scattering process. This makes inversion of electromagnetic measurements via microwave radar systems into sea wave information difficult.

SUMMARY

In one example, a system can include a radiation source and an antenna. The radiation source can generate pulsed signals. The antenna can be coupled with the radiation source The antenna can cooperate with the radiation source to transmit a radio frequency (RF) signal to a wave field having one or more waves based on the pulsed signals. The RF signal can have a frequency and a phase offset. The antenna can receive backscattered signals from the wave field. The system can further include a local oscillator that can be coupled with the antenna and can downconvert the backscattered signals into baseband signals. The system further includes a non-transitory memory to store machine readable instructions. The system can even further include a processor that can be coupled to the local oscillator. The processor can access the memory and executes the machine readable instructions stored therein. The machine readable instructions can cause the processor to average a range of the baseband signals to the determine a phase offset estimate, determine phase corrected returns by conjugate multiplication of the baseband signals and the phase offset estimate and determine a relative velocity of each of the one or more waves of the wave field based on Doppler processing using the phase corrected returns.

In another example, a system can include a radiation source and an antenna. The radiation source can generate pulsed signals. The antenna can be coupled with the radiation source The antenna can cooperate with the radiation source to transmit a radio frequency (RF) signal to a wave field having a plurality of waves based on the pulsed signals. The antenna can receive backscattered signals from the wave field. The system can further include a local oscillator that can be coupled with the antenna and can downconvert the backscattered signals into baseband signals. The system further includes a non-transitory memory to store machine readable instructions. The system can even further include a processor that can be coupled to the local oscillator. The processor can access the memory and executes the machine readable instructions stored therein. The machine readable instructions can cause the processor to identify an observed portion of the backscattered signals as bad data based on an evaluation of a power of the observed portion of the backscattered signals relative to an expected power value and remove the bad data from further processing.

DETAILED DESCRIPTION

The present disclosure relates to systems and methods for measuring a wave field of a body of water. The term "wave field" as used herein can mean one or more water waves of a body of water. Thus, a wave field can include, but not limited to, an ocean wave, a sea wave, or the like. Systems and methods described herein can generate wave field information characterizing the wave field using radio frequency (RF) signals. The systems and methods described herein can use backscattered signals from the wave field to characterize a wave velocity and a wave height of the wave field. Doppler processed velocity information can be correlated the wave velocity of and energy information (e.g., power information) associated with the backscattered energy can be correlated with the wave height. Furthermore, the systems and methods described herein can be used to model future motion of vehicles (e.g., ships) traveling based on the generated wave field information.

Figure 1:
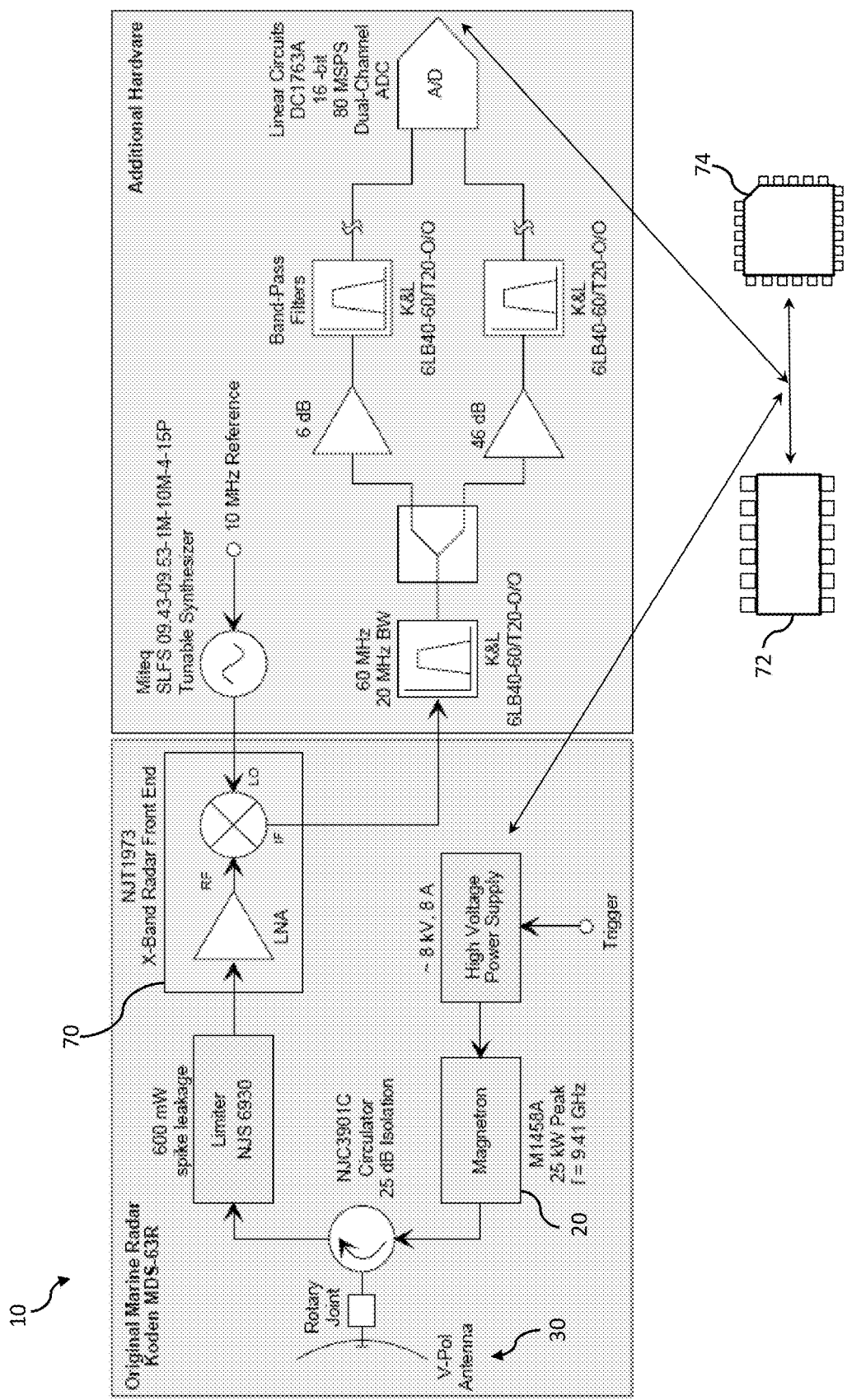
FIG. 1 illustrates an example of a system for measuring wave fields of a body of water.

FIG. 1 illustrates an example of a wave field measuring system (WMS) 10 that can be configured to measure wave fields of a body of water. The WMS 10 can include a radiation source 20. The radiation source 20 can be configured to generate RF energy. The radiation source 20 can be one of a magnetron, a klystron, or the like. The radiation source 20 can be configured to generate pulsed signals, such as pulsed sinusoidal signals. In one example, a magnetron can be operated according to pulses of an applied voltage (e.g., high-energy portions of the applied voltage). As is provided in greater detail herein, the phase of the pulsed sinusoid may be unknown at the time of transmission. The term "signal," as used herein, can mean a waveform (e.g., electrical, optical, magnetic, or electromagnetic), such as a direct current (DC) signal, alternating-current (AC) signal, sinusoidal-wave signal, triangular-wave signal, square-wave signal, and the like, that is capable of traveling through a medium.

Figure 2:
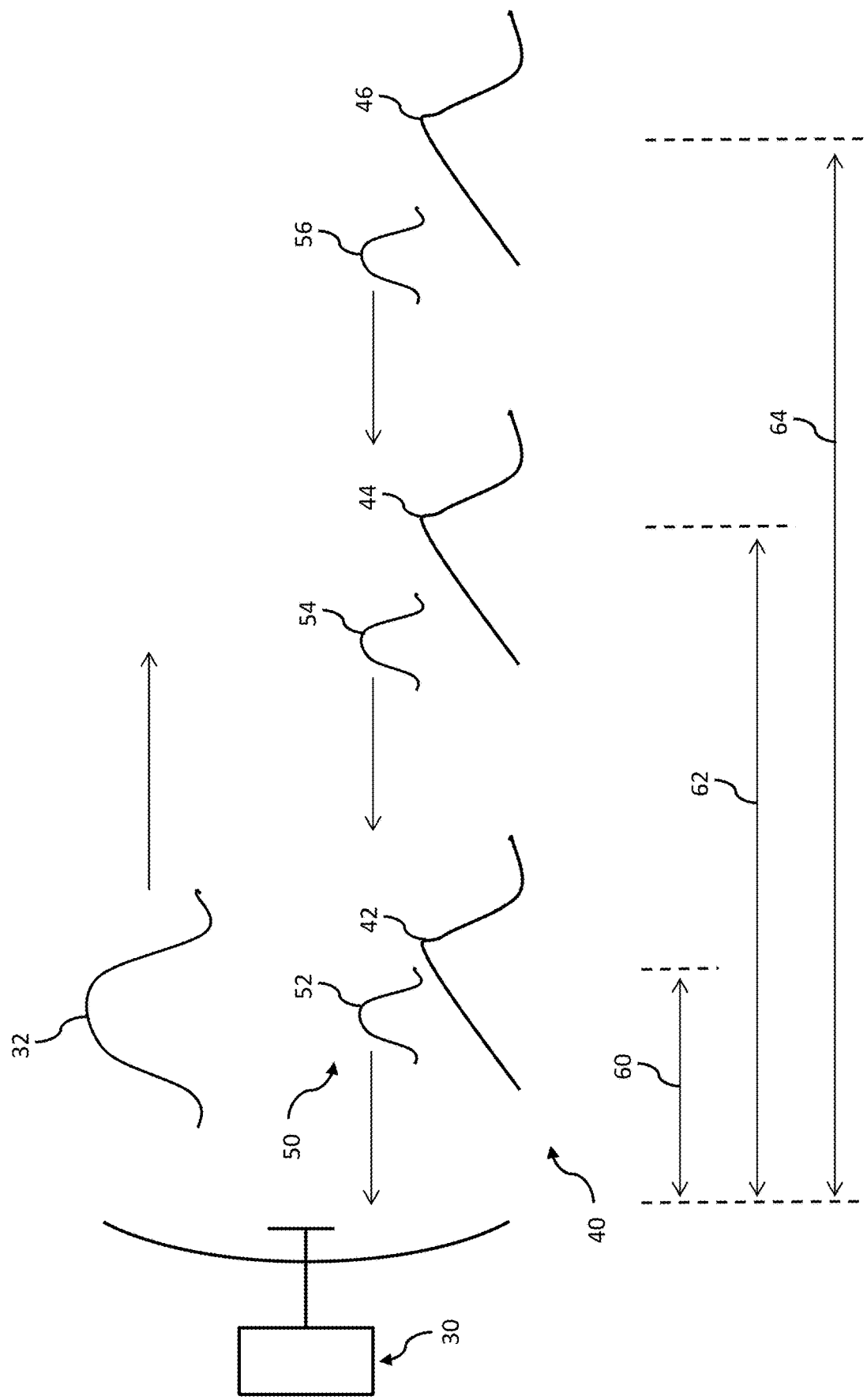
FIG. 2 illustrates an example of an antenna.

Referring collectively to FIGS. 1 and 2, the WMS 10 can further include an antenna 30. The antenna 30 can be configured to transmit and/or receive RF signals. The antenna 30 can be configured to transmit or receive signals within a predetermined range of frequencies. For example, the antenna 30 can be configured to communicate RF electromagnetic signals having a frequency between about 3 kiloHertz (kHz) and about 300 GigaHertz (GHz). Generally, frequencies used for radar signals can include RF electromagnetic signals having a frequency between about 3 MegaHertz (MHz) and about 110 GigaHertz (GHz). Although the WMS 10 is described herein with respect to microwave signals in an X band, the WMS 10 can be configured for any radar band. In one example the antenna 30 can be polarized, such as, for example, vertically polarized or horizontally polarized. For water wave measuring applications, vertical polarization can have improved performance compared to horizontal polarization.

The antenna 30 can be communicatively coupled with the radiation source 20. As used herein, the phrase "communicatively coupled" can mean that components are capable of exchanging data signals with one another such as, for example, electrical signals via conductive medium, electromagnetic signals via air, optical signals via optical waveguides, and the like. The antenna 30 can cooperate with the radiation source 20 to transmit an RF signal 32 to a wave field 40. For example, the radiation source 20 can provide an electrical signal oscillating at a radio frequency to the antenna 30. The antenna 30 can be configured to transform the electrical signal into the RF signal 32 and transmit the RF signal 32. Accordingly, the RF signal 32 can include a carrier frequency and a phase offset.

The antenna 30 can further be configured to receive backscattered signals 50 from the wave field 40 in response to the transmitted RF signal. The backscattered signals 50 can be converted by the antenna 30 from RF electromagnetic signals into representative backscattered electrical signals. The, the wave field 40 can include a plurality of individual waves each at a different range with respect to the antenna 30. For example, the wave field 40 can include a first wave 42 offset from the antenna 30 by a first range 60, a second wave 44 offset from the antenna 30 by a second range 62, and a third wave 46 offset from the antenna 30 by a third range 64. It is noted that, while FIG. 2 depicts three individual waves, the wave field 40 can include any number of individual waves.

Each of the first wave 42, the second wave 44, and the third wave 46 can reflect a portion of the RF signal 32 back to the antenna 30. Accordingly, the backscattered signals 50 can include a first backscattered signal 52 indicative of the first wave 42, a second backscattered signal 54 indicative of the second wave 44, and a third backscattered signal 56 indicative of the third wave 46. Each of the backscattered signals 50 can be analyzed to characterize the wave field 40. For example, power information associated with a given backscattered signal can be correlated with a wave height of a corresponding wave, time of flight information associated with the given backscattered signal can be correlated with range of the corresponding wave, and Doppler processing of subsequent given backscattered signals can be correlated with velocity of the corresponding wave.

Referring collectively to FIGS. 1 and 2, the WMS 10 can further include a local oscillator 70 that can be configured to mix signals generated by the antenna 30. For example, the local oscillator 70 can be configured to mix backscattered electrical signals generated by the antenna 30. The local oscillator 70 can be communicatively coupled with the antenna 30. The local oscillator 70 can be configured to downconvert the backscattered electrical signals provided by the antenna 70 into baseband signals. Thus, the backscatter signals 50 can be downconverted into baseband signals.

The local oscillator 70 can be configured introduce a local oscillator phase into the baseband signals. Depending upon a quality of the local oscillator 70 (e.g., such as an age of the local oscillator 70), a stability of the introduced local oscillator phase can vary (e.g., drift) over time. The quality of the local oscillator 70 can be improved such that the local oscillator phase is substantially constant (e.g., does not drift). With a substantially stable local oscillator phase, a coherent-on-receive radar system can be implemented by measuring the RF signal 32 as it is transmitted, e.g., the receiver can be active when the transmitter transmits. The received copy of the RF signal 32 can be used as a matched filter in processing the backscattered signals 50.

The WMS 10 can further include one or more processors 72 that can be configured to execute machine readable instructions to perform functions according to the methods described herein. The one or more processors 72 can be communicatively coupled to the local oscillator 70 and can be configured to analyze the baseband signals. As used herein, the term "processor" can mean any device capable of executing machine readable instructions. Accordingly, each processor can be a controller, an integrated circuit, a microchip, or any other device capable of implementing logic.

The system WMS can further include memory 74 that can be communicatively coupled to the one or more processors 72. The memory 74 described herein may be RAM, ROM, a flash memory, a hard drive, or any device capable of storing machine readable instructions. Accordingly, the functions, modules, and processes described herein can be provided as machine readable instructions stored on memory 74 and executed by the one or more processors 72. The machine readable instructions can be provided in any programming language of any generation (e.g., 1GL, 2GL, 3GL, 4GL, or 5GL) such as, e.g., machine language that may be directly executed by the processor, or assembly language, object-oriented programming (OOP), scripting languages, microcode, etc., that may be compiled or assembled into machine readable instructions and stored on a machine readable medium. Alternatively or additionally, the functions, modules, and processes described herein may be written in a hardware description language (HDL), such as logic implemented via either a field-programmable gate array (FPGA) configuration or an application-specific integrated circuit (ASIC), and their equivalents. Accordingly, the functions, modules, and processes described herein may be implemented in any conventional computer programming language, as pre-programmed hardware elements, or as a combination of hardware and software components.

Referring collectively to FIGS. 1 and 2, the WMS 10 can be configured to generate data characterizing the backscattered power and velocity measurements for the wave field 40 over various ranges such as, for example, about 4 kilometers (km). The antenna 30 can be positioned above the wave field 40 and can be rotated azimuthally (e.g., about 24 revolutions per minute) with respect to the wave field 40. The antenna 30 can be configured to measure the wave field 40 at multiple azimuth angles per rotation to measure an entirety of the wave field 40 surrounding the antenna 30.

As discussed above, the radiation source 20 and the antenna 30 can be configured to cooperate to transmit the RF signal 32. The radiation source 20 can be a high power source of RF energy, such as a magnetron, that can be configured to generate pulsed sinusoidal transmissions. As with any self-oscillating device, such as the magnetron, there is no way to predict a phase of the pulsed sinusoid generated. Thus, the phase of the pulsed sinusoid generated by the radiation source 20 on transmission is not controllable, for example, when using the magnetron. Accordingly, the radiation source 20 can introduce a phase offset that is unknown at a time of transmission of the RF signal 32. The RF signal 32 can be represented with the following equation:

$$u(t) = q(t)e^{j\omega_c t}e^{j\phi} \quad \text{(Equation 1)},$$

where $q(t)$ is a pulse envelope, $\omega_c$ is an RF carrier frequency associated with the antenna 30, and $\phi$ is the phase offset introduced by the source of radiation 20.

The signal received by the antenna 30 from a given target (e.g., first backscattered signal 52, second backscattered signal 54, or third backscattered signal 56) can be represented with the following equation:

$$r(t) = q(t-\tau)e^{j\omega_c t}e^{j\phi}e^{j\omega_c \tau} \quad \text{(Equation 2)},$$

where $\tau = 2R/c$ is a round trip delay to the given target (e.g., wave) and $c$ is a speed of propagation.

As mentioned, when received at the radar, the backscattered signals 50 can be downconverted using the local oscillator 70. For example, downconversion can include multiplication of the received backscattered signals 50 with a sinusoidal signal generated by the local oscillator 70. Accordingly, the backscattered signals 50 can be processed at an intermediate frequency (IF) range to improve processing efficiency. For example, an a backscattered signal 50 having a frequency in the range of about 9.4 GHz to about 9.42 GHz can be downconverted with an X-band sinusoidal signal to an IF signal with a frequency in a range of about 50 MHz to about 70 MHz. Downconverting Equations (1) and (2) with the local oscillator 70 tuned to $\omega_{LO}$ can result in baseband signals of:

$$r'(t) = q(t-\tau)e^{j\phi}e^{j(\omega_c - \omega_{LO})t}e^{j\omega_c \tau} \quad \text{(Equation 3)}.$$

Measurement of the velocity information associated with the wave (e.g., the first wave 42, the second wave 44 or the third wave 46) can include determining the term $e^{j\omega_c \tau}$ and observing how the term varies over multiple pulse returns. Since $\tau = 2R/c$, $e^{j\omega_c \tau}$ can be rewritten as $$e^{j 2 \frac{\omega_c}{c} R}$$

or $e^{j2kR}$ where $$k = \frac{\omega_c}{c},$$

a wave moving with velocity v in radar range will experience a phase change between repeated RF signal 32 transmissions of $e^{j2k(R+vT)}$, where T is the time interval between RF signals 32 transmitted to the same target, e.g., the pulse repetition interval (PRI). Thus, an apparent Doppler frequency for the wave can be $kv/\pi = 2v/\lambda$, where $\lambda = 2\pi/k$ is an electromagnetic wavelength.

Since $q(t-\tau)$ is known, $e^{j\omega_c \tau}$ can be determined for a signal from the wave (e.g., single pulse return) by correcting for sources of error $e^{j\phi}e^{j(\omega_c - \omega_{LO})t}$. The radiation source 20 can produce an RF carrier frequency $\omega_c$ that is substantially stable and repeatable from transmission to transmission (e.g., pulse to pulse). Therefore for a given range delay t, the term $e^{j\omega_c t}$ can be substantially stable and repeatable, and does not cause substantial error in estimating the velocity of the wave.

As noted above, the radiation source 20 can introduce a phase offset $e^{j\phi}$ that can vary from pulse-to-pulse. Accordingly, the phase offset should be corrected for each backscattered pulse to estimate a velocity of the wave. As described herein, two cases exist for the induced local oscillator phase term $e^{-j\omega_{LO} t}$. In an example where the local oscillator 70 has relatively low stability, the induced local oscillator phase $\omega_{LO}$ can vary from pulse-to-pulse. Accordingly, a linear phase ramp, e.g., phase as a function of time t (which is equivalent to range), can occur for each pulse that varies between pulses. The changing phase can be corrected to allow for accurate velocity estimation.

In another example where the local oscillator phase is substantially constant, velocity of the wave can be estimated by estimating only an initial phase $e^{j\phi}$ for each pulse. The initial phase can be estimated by measuring the RF signal 32 as it is transmitted. The received copy of the RF signal 32 can be used as a matched filter in processing the backscattered signals 50. Accordingly, the initial phase $e^{j\phi}$ can be removed, which can allow $e^{j\omega_c \tau}$ to be determined for each pulse at each range. The Doppler frequency and the related velocity can be determined using subsequent processing over multiple pulses separated by the PRI for the wave.

The performance of matched filtering can be degraded by synchronization errors and reflections by objects near the transmitter. For example, the estimation of the initial phase $e^{j\phi}$ can be degraded if the receiver and transmitter are not precisely synchronized. The mismatch between the transmit pulse time and the receiver sampling time can cause estimation errors that can degrade the accuracy of velocity measurements of the wave. Additionally, if the transmitted pulse encounters reflections near the antenna 30 (e.g. from ship masts or other objects in the vicinity of the antenna 30), the antenna 30 can receive both the transmitted pulse and corresponding reflections at substantially the same time. Thus, the reflections degrade the estimation of initial phase $e^{j\phi}$ and the accuracy of the resulting velocity measurements for the wave.

It is noted that in many radar applications (e.g. in looking at flying targets), backscatter comes primarily from a single target that is isolated at a particular range. In the single target scenario, velocities measured in radar processing are relative along range velocity between the radar and the observed target. The relative velocity of the single target is an important parameter. In contrast, measurements of the wave field 40 can include ship-based radar observations of the sea surface. Thus, backscattered signals 50 can be provided from the sea surface at every point in range and velocity information can obtained at every range. Local changes in the velocity can represent the wave field 40, e.g., sea surface motions, or wave motions.

Accordingly, since velocity v(t) is observed versus time (range), the measurement of the wave field 40 can be unaffected if velocity is represented by:

$$v'(t)=v(t)-<v(t)> \quad \text{(Equation 4)},$$

where $$<v(t)> = \frac{1}{T_1}\int_0^{T_1} v(t')dt' \quad \text{(Equation 5)}$$

is the average velocity over a range represented by the time interval $T_1$.

The quantity $<v(t)>$ is non-zero, for example, when a vehicle, such as a ship, carrying the WMS 10 is moving at a speed with respect to the wave field 40. Wave motions can also be measured if $<v(t)>$ were estimated locally as $$<v(t)> = \frac{1}{T_2}\int_{t-T_2/2}^{t+T_2/2} v(t')dt'. \quad \text{(Equation 6)}$$

wherein $T_1$ can correspond to an entire range extent from which the backscattered signals 50 are observed, while $T_2$ can correspond to a shorter range extent such that only a local average is included. If the local average approach is used, any wave velocities occurring over a range extent larger than that can be represented by $T_2$ will be excluded.

Since the phase offset is injected by the radiation source 20, $e^{j\varphi}$ can be substantially constant versus range (time). Additionally, depending upon the stability of the local oscillator 70, $e^{-j\omega_{LO}t}$ can be substantially constant, or can vary relatively slowly over range. Accordingly, averages of returns over range can be used to determine a phase offset estimate of $e^{j\varphi}e^{-j\omega_{LO}t}$.

The baseband signals can be normalized locally to remove variations of signal amplitude in range. In some examples, normalized signals given by:

$$r'_n(t) = \frac{r'(t)}{\sqrt{\frac{1}{2T_3}\int_{t-T_3}^{t+T_3}|r'(t')|^2 dt'}}, \quad \text{(Equation 7)}$$

where $T_3$ corresponds to a relatively short time interval. The normalized signal $r'_n(t)$ can be approximately unit amplitude in range, and can retain the original signal phase information.

The phase offset estimate can be determined by averaging a range of the normalized signals. The phase offset estimate can be given by:

$$p(t) = \frac{1}{T_2}\int_{t-T_2/2}^{t+T_2/2} r'_n(t)dt'. \quad \text{(Equation 8)}$$

It is noted that the complex phasors $e^{j\varphi}e^{-j\omega_{LO}t}$ are averaged in Equation 8 as opposed to averaging just the phase itself, which avoids errors associated with phase wrapping. The averaging operation can be performed with the local version as indicated in Equation 8, or the full range extent version (i.e. using $T_1$ instead of $T_2$).

Generally, in examples where the local oscillator phase is substantially constant, the averaging operation can be improved by averaging over the largest extent possible, e.g., $T_1$. The increased range avoids removing wave features that occur on relatively long spatial scales, i.e., spatial scales larger than the local version of the range. In examples where the local oscillator phase is unstable, the shorter range extent $T_2$ is preferred. For instance, the phase offset estimate may need to be performed more frequently as the local oscillator phase can change with range. Applicants have discovered that relative velocities can be reconstructed with reasonable accuracy for $T_2$ values representing range extents of a few hundred meters for X-band radar. It is noted that the range extent can be dependent upon the change in local oscillator phase over range, e.g., the range extend should be shortened as the rate of change in local oscillator phase over range increases.

Since the phase offset estimate corresponds to the complex phasors $e^{j\varphi}e^{-j\omega_{LO}t}$, phase corrected returns can be determined by conjugate multiplication of the normalized signals and the phase offset estimate. Accordingly, the phase corrected returns can be given by:

$$r'_c(t)=r'_n(t)p^*(t) \quad \text{(Equation 9)}.$$

Doppler processing can be performed using the phase corrected returns to determine a relative velocity of each of the plurality of waves of the wave field 40.

The examples provided herein can be configured to identify and remove bad data from further processing when the data fails to meet an expected value for power. For example, bad data can be generated by radio frequency interference (RFI), insufficient signal-to-noise ratio (SNR), backscatter from non-wave field objects (e.g., land returns, other vessels, rain returns, etc.), or combinations thereof.

In some examples, radar measurements can be corrupted by RFI from another transmitter. Accordingly, RFI can vary from pulse-to-pulse, since other transmitters are not synchronized to the WMS 10. RFI detection and removal can be performed at each range by examining the returns at that range over multiple pulses separated by the PRI. For example, the antenna 30 can be configured to transmits the RF signal 32 repetitively for a plurality of instances, e.g., at substantially the same azimuth angle over multiple time intervals separated by the PRI. The power of the backscattered signals 50 corresponding to a single range can be determined for each of the instances. An average power for a sample set of the backscattered signals 50 can be compared to a single instance to determine if the instance exceeds a threshold.

For example, the currently observed power corresponding to the range can be compared to the average power over the last N pulses, where N is a predetermined value. If the currently observed power is greater than the threshold, the current power can flagged and excluded from subsequent processing over the coherent processing interval (CPI) such as, for example, average powers, velocity measurements, and the like. In some examples, the threshold can be equal to (THRESH) times the average power.

Alternatively or additionally, the backscattered signals 50 can be excluded from further processing when the signal has insufficient SNR to provide useful information. For example, the phase corrected returns can be excluded from Doppler processing, when a coherent average of the phase corrected returns and an incoherent average of the phase corrected return fail to agree within a threshold. For a given CPI such as, but not limited to, about 12 radar pulses, the following comparison can be made:

$$\left|\sum_{n=1}^{Nc} r'_{cn}(t) r'^*_{c(n-1)}(t)\right|^2 < Q \sum_{n=1}^{Nc} |r'_{cn}(t) r'^*_{c(n-1)}(t)|^2, \quad \text{(Equation 10)}$$

where the left hand side of the equation represents the coherent power of the pulse pair product $r'_{cn}(t) r'^*_{c(n-1)}(t)$ averaged over the $N_c$ pulses of the CPI, the right hand side represents a threshold Q times the incoherent power averaged over the CPI. Since Doppler processing requires returns whose phases are stable, the coherent average and the incoherent average should have a substantially fixed relationship for stable phase returns. If phase returns are not stable over the CPI, the coherent average amplitude will decrease rapidly. Accordingly, should the coherent average be less than the threshold times the incoherent average, the phase corrected returns can be flagged as bad and excluded from further processing.

Alternatively or additionally, data having poor SNR can be identified based on a curve for the expected variation of the wave field 40 return power versus range. The power versus range curve can be determined using one or more previous backscatter signals. For example, the average power versus range curve can be determined using a single frame of radar data immediately prior to the time of the analyzed instance of data. In some examples, the frame of radar data can correspond to a complete radar image, e.g., corresponding to one complete rotation of the antenna 30.

In one example, the least squares method can be used to find appropriate coefficients to fit mean power versus range curve to a polynomial given by, for example:

$$Ax + Bx^2 + Cx^4 + Dx^8 + Ex^{16} + Fx^{24} + Gx^{35} + Hx^{50} \quad \text{(Equation 11)},$$

where A, B, C, D, E, F, G, and H are polynomial coefficients. For computational efficiency, a Moore-Penrose pseudoinverse can be calculated a priori and stored in a lookup file. The monomial powers provided above can be chosen experimentally in order to cover a wide range of wave conditions, and the curve fit can updated/recalculated. For example, the curve fit can be updated every 6 millisecond (ms) with each preprocessed radar pulse. Radar returns falling significantly below the expected returns can be flagged as having insufficient SNR and excluded from further processing.

Alternatively or additionally, the backscattered signals 50 arising from other targets can be excluded using an average power versus range determined by averaging over multiple frames of radar data. A polynomial fit can be used to determine the average power versus range curve. The average power versus range curve can be used to normalize preprocessed radar returns along range. A set of predefined thresholds can be applied to normalized radar returns in order to identify and flag regions with other targets. Accordingly, the backscattered signals 50 generated by other targets can be excluded from further processing.

Experiments were performed to validate a performance of the WMS 10 as described herein. A Koden MDS-63R non-coherent maritime radar intended for use on smaller nautical vessels was modified. The principal modifications included refinement on the receiver local oscillator, the splitting of the output intermediate frequency (IF) into two channels—one high and one low gain—and the addition of an FPGA processor to implement the receive coherence and provide real time data analysis. A control box was connected by an Ethernet link to a control PC. The IF frequency of the radar was 60 MHz, and a 20 MHz bandpass filter was applied to the channel to remove spurious components. Subsequently, the channel was split into two channels: the low gain channel had 6 decibel (dB) of gain; and the high gain channel had 46 dB of gain. After amplification, both channels were again bandpass filtered. All of these replacement and additional components were positioned inside the original Koden pedestal. The outputs were transferred along a 50 meter (m) cable to a dual channel analog-to-digital convertor (ADC) running at 80 mega samples per second (MSPS). After digitization the channels were processed using a field-programmable gate array (FPGA) (hosted on a Xilinx ML-605 Virtex-6 development board) to extract Doppler/velocity information using a pulse-pair method that can help overcome data storage and transfer problems.

Figure 3:
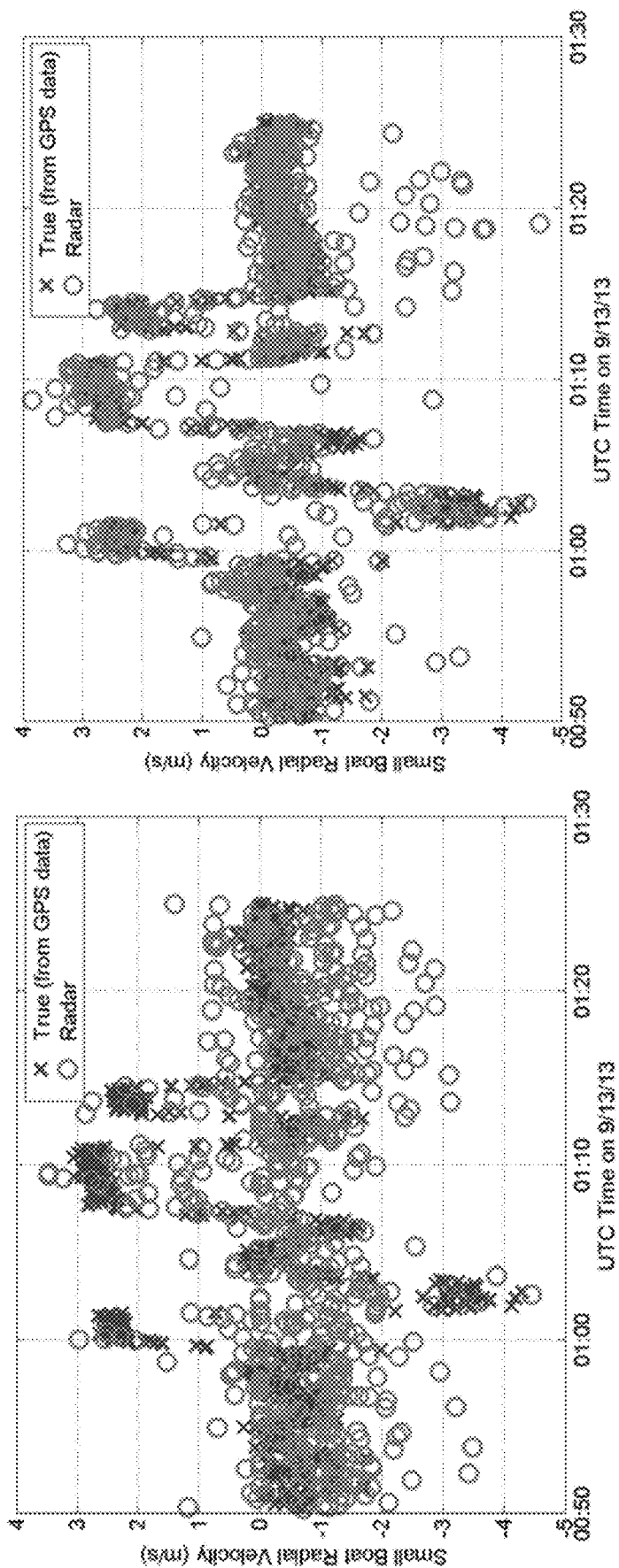
FIG. 3 illustrates test data measured with an exemplary system for measuring wave fields of a body of water, such as the system of FIG. 1.

FIG. 3 illustrates the results from a radar (e.g., WMS 10, as shown in FIG. 1) operated from aboard a first ship measured returns from a second ship that was operated in the vicinity of the first ship and that carried a radar reflective target. The velocity of the second ship with respect to the first ship was known because Global Positioning System (GPS) measurements were recorded for both vessels during a time of the measurement to provide known truth data. The radar measurements of the second boat velocity were compared to the known truth velocities. A radar having a local oscillator with substantially stable phase was used for the measurements, making traditional coherent-on-receive processing applicable. The left plot depicts data measured with the traditional phase correction processing and the right plot depicts data measured with according to the examples provided herein. As illustrated in FIG. 3, the examples provided herein demonstrated increased agreement in velocity measurements to the known truth as compared to the traditional phase correction processing.

It is noted that the terms "substantially" and "about" may be utilized herein to represent an inherent degree of uncertainty that can be attributed to any quantitative comparison, value, measurement, or other representation. These terms are also utilized herein to represent a degree by which a quantitative representation may vary from a stated reference without resulting in a change in the basic function of the subject matter at issue.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims.

What is claimed is:

1. A system comprising:
   a radiation source to generate pulsed signals;
   an antenna coupled with the radiation source, wherein the antenna cooperates with the radiation source to transmit a radio frequency (RF) signal to a wave field having one or more waves based on the pulsed signals, the RF signal having a frequency and a phase offset, and wherein the antenna receives backscattered signals from the wave field;
a local oscillator coupled with the antenna that downconverts the backscattered signals into baseband signals;
a non-transitory memory to store machine readable instructions; and
a processor coupled to the local oscillator, wherein the processor accesses the memory and executes the machine readable instructions to:
average a range of the baseband signals to determine a phase offset estimate;
determine phase corrected returns by conjugate multiplication of the baseband signals and the phase offset estimate; and
determine a relative velocity of each of the one or more waves of the wave field based on Doppler processing using the phase corrected returns.

2. The system of claim 1, wherein the machine readable instructions further cause the processor to normalize the baseband signals to determine normalized signals and thereby removing variations of amplitude in the baseband signals.

3. The system of claim 2, wherein the phase offset estimate is determined based on the normalized signals for the baseband signals.

4. The system of claim 1, wherein the radiation source is a magnetron, and the phase offset is induced by the magnetron.

5. The system of claim 1, wherein:
the antenna transmits the RF signal repetitively for a plurality of instances, wherein each instance is separated by a pulse repeat interval; and
the antenna receives the backscattered signals for the plurality of instances.

6. The system of claim 5, wherein the machine readable instructions further cause the processor to:
determine power for the backscattered signals corresponding to a range;
determine an average power for a sample set of the backscattered signals;
determine a threshold using the average power; and
exclude an observed one of the backscattered signals corresponding to the range from one of the average power and the Doppler processing based on an evaluation of the power of the observed one of the backscattered signals relative to the threshold.

7. The system of claim 6, wherein the evaluation comprises comparing the power of the observed one of the backscattered signals relative to the threshold to determine if the power of the observed one of the backscattered signals is greater than the threshold.

8. The system of claim 1, wherein the machine readable instructions further cause the processor to:
determine a coherent average of the phase corrected returns over a coherent pulse interval;
determine an incoherent average of the phase corrected returns over the coherent pulse interval; and
exclude the phase corrected returns from the Doppler processing based on an evaluation of the coherent average of the phase corrected returns, the incoherent average of the phase corrected returns and a threshold.

9. The system of claim 8, wherein the phased corrected returns are excluded from the Doppler processing when coherent average of the phase corrected returns is less than the threshold times the incoherent average of the phase corrected returns.

10. The system of claim 1, wherein the machine readable instructions further cause the processor to:
determine a power versus range curve using backscattered signals; and
exclude an observed one of the backscattered signals from the Doppler processing based on an evaluation of a power of the backscattered signals and the power versus range curve relative to a threshold.

11. A system comprising:
a radiation source to generate pulsed signals;
an antenna coupled with the radiation source, wherein the antenna cooperates with the radiation source to transmit a radio frequency (RF) signal to a wave field having a plurality of waves based on the pulsed signals, wherein the antenna receives backscattered signals from the wave field;
a local oscillator coupled with the antenna, wherein the local oscillator downconverts the backscattered signals into baseband signals;
a non-transitory memory to store machine readable instructions; and
a processor coupled to the local oscillator, wherein the processor accesses the memory and executes the machine readable instructions to:
identify an observed portion of the backscattered signals as bad data, based on an evaluation of a power of the observed portion of the backscattered signals relative to an expected power value; and
remove the bad data from further processing.

12. The system of claim 11, wherein:
the antenna transmits the RF signal repetitively for a plurality of instances, wherein each instance is separated by a pulse repeat interval; and
the antenna receives the backscattered signals for the plurality of instances.

13. The system of claim 12, wherein the machine readable instructions further cause the processor to:
detect power for the backscattered signals corresponding to a range;
determine an average power for a sample set of the backscattered signals; and
determine the expected power value using the average power.

14. The system of claim 11, wherein the machine readable instructions further cause the processor to:
average a range of the baseband signals to determine a phase offset estimate indicative of the phase offset;
perform conjugate multiplication with the baseband signals and the phase offset estimate to determine phase corrected returns;
determine a coherent average of the phase corrected returns over a coherent pulse interval, wherein the observed portion of the backscattered signals comprises the baseband signals over the coherent pulse interval;
determine an incoherent average of the phase corrected returns over the coherent pulse interval; and
evaluate the coherent average and the incoherent average.

15. The system of claim 14, wherein in response to the evaluation, the power of the observed portion of the backscattered signal fails to agree with the expected power value, when the coherent average and the incoherent average fail to agree within a threshold.

16. The system of claim 14, wherein the phased corrected returns are excluded from the Doppler processing when coherent average of the phase corrected returns is less than the threshold times the incoherent average of the phase corrected returns.

17. The system of claim 11, wherein the machine readable instructions further cause the processor to:
   determine a power versus range curve using backscattered signals; and
   determine the expected power using the power versus range curve.

18. The system of claim 17, wherein the machine readable instructions further cause the processor to exclude an observed one of the backscattered signals from the further processing based on an evaluation of a power of the backscattered signals and the power versus range curve relative to a threshold.

19. The system of claim 18, wherein the further processing comprises Doppler processing.

20. The system of claim 19, wherein the radiation source is a magnetron.

21. A system comprising:
   a receiver for receiving backscattered signals from a field;
   a converter coupled with the receiving unit for generating baseband signals from the backscattered signals;
   a non-transitory memory to store machine readable instructions; and
   a processor coupled to the converter, wherein the processor accesses the memory and executes the machine readable instructions to:
      average a range of the baseband signals to determine a phase offset estimate;
      determine phase corrected returns by conjugate multiplication of the baseband signals and the phase offset estimate; and
      determine a parameter of the field using the phase corrected returns.

22. The system of claim 21, further comprising:
   a transmitter for transmitting a RF signal toward the field that is a wave field with the backscattered signals being generated from the RF signal reaching the wave field.

23. The system of claim 22, further comprising:
   a radiation source to generate pulsed signals; and
   an antenna coupled with the radiation source, wherein the antenna includes the transmitter for generating using the pulsed signals and transmitting the RF signal to the wave field, and wherein the antenna includes the receiver for receiving the backscattered signals from the wave field.

24. The system of claim 23, wherein said step of determine a parameter of the wave field includes:
   determine a relative velocity of each of one or more waves of the wave field based on Doppler processing using the phase corrected returns.

25. The system of claim 21, wherein said converter comprises a local oscillator that downconverts the backscattered signals into the baseband signals.

* * * * *